J. BROWN.
Sower Attachments to Plows.

No. 145,148.

Patented Dec. 2, 1873.

WITNESSES.
E. A. Bates.
Geo. E. Upham,

INVENTOR.
Job Brown,
Chipman Hosmer & Co,
Attys.

UNITED STATES PATENT OFFICE.

JOB BROWN, OF SOUTHAMPTON, ILLINOIS.

IMPROVEMENT IN SOWER ATTACHMENTS TO PLOWS.

Specification forming part of Letters Patent No. 145,148, dated December 2, 1873; application filed January 4, 1873.

*To all whom it may concern:*

Be it known that I, JOB BROWN, of Southampton, in the county of Peoria and State of Illinois, have invented a new and valuable Improvement in Sower Attachment to Plows; and I do hereby declare that the following is a full, clear, and exact description of the construction and operation of the same, reference being had to the annexed drawings, making a part of this specification, and to the letters and figures of reference marked thereon.

Figure 1:
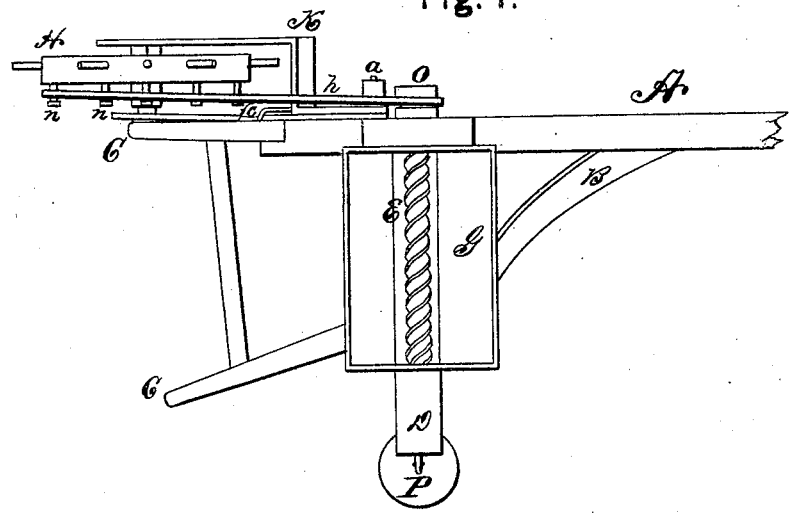
Figure 2:
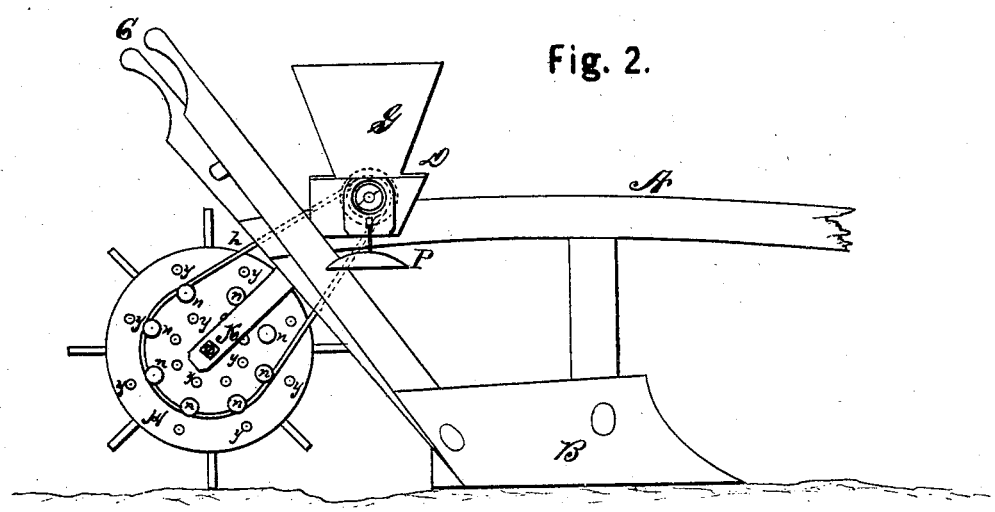

Figure 1 of the drawings is a representation of a plan view of my plow attachment. Fig. 2 is a side elevation of the same.

My invention relates to attachments to plows intended for use in sowing seeds; and it consists in the novel construction and arrangement of the devices hereinafter described, whereby seed may be sown upon the newly-formed furrows at the time such furrows are made, and by the same motive power that forms them.

A of the drawings represents the beam, B the mold-board, and C the handles, of an ordinary plow. D represents a supporting-bar, which is attached to the plow-beam by suitable screws, and thereby made removable and attachable at will. This bar D is made hollow from end to end to receive and provide for the operation of the worm E, hereinafter mentioned. G represents a seed-hopper, firmly attached to the bar D, as shown. H indicates an operating-wheel, having spurs on its periphery to secure rotation when the wheel rests on the ground. K indicates a stirrup, pivoted to the end of the bar D by the pivot-pin *a*, and secured to the side of the left-hand plow-handle by the removable strap *c*. The letters *n* represent a series of screws set in circular form on the side of the operating-wheel.

It will be observed that the side of said wheel is perforated to receive said screws. These perforations are marked *y* on the drawings, and are intended to be made in such manner that when the screws *n* are in position, whether in the inner, outer, or middle series of perforations, they shall form a circle for the purpose of operating the belt or cord next mentioned. The letter *h* represents a band or cord, which is passed over the screws *n* and the drum *o* on the end of the worm-shaft E, as shown. P represents a circular plate, constructed with a convex upper surface, and suspended by a cord or otherwise to the right-hand end of the bar D. This plate serves to scatter the seed upon the furrow after it has left the hopper.

It will readily be observed that the speed of the worm E is regulated by the position of the screws *n* bearing the belt, and that when these screws are adjusted in the outer circle of perforations, the worm is moved with greater rapidity, and that its motion is necessarily lessened by moving said screws inward toward the center of the wheel.

What I claim as my invention, and desire to secure by Letters Patent, is—

The attachment to an ordinary plow, consisting of the supporting-bar D, hopper G, worm E, convex scattering-plate P, pivoted stirrup K, and wheel H having spurs, as described, to serve as band-wheels for the driving-belt, the several parts being arranged as specified.

In testimony that I claim the above I have hereunto subscribed my name in the presence of two witnesses.

JOB BROWN.

Witnesses:
IVORY C. BUTLER,
ROBT. S. GREER.